No. 890,630. PATENTED JUNE 16, 1908.
G. W. EUKER.
DRIVING MECHANISM.
APPLICATION FILED JUNE 24, 1905.

2 SHEETS—SHEET 1.

Witnesses.
J. Ellis Glen
Helen Oxford

Inventor.
George W. Euker.
by Albert G. Davis
Atty

No. 890,630.

PATENTED JUNE 16, 1908.

G. W. EUKER.
DRIVING MECHANISM.
APPLICATION FILED JUNE 24, 1905.

2 SHEETS—SHEET 2.

Witnesses.

Inventor.
George W. Euker.
by Albert G. Davis
Att'y.

UNITED STATES PATENT OFFICE.

GEORGE W. EUKER, OF PITTSFIELD, MASSACHUSETTS, ASSIGNOR TO STANLEY-G. I. ELECTRIC MANUFACTURING COMPANY, A CORPORATION OF NEW JERSEY.

DRIVING MECHANISM.

No. 890,630.  Specification of Letters Patent.  Patented June 16, 1908.

Application filed June 24, 1905. Serial No. 266,731.

*To all whom it may concern:*

Be it known that I, GEORGE W. EUKER, a citizen of the United States, residing at Pittsfield, county of Berkshire, State of Massachusetts, have invented certain new and useful Improvements in Driving Mechanism, of which the following is a specification.

My present invention relates to electric motor drives for tools or machines, and more particularly to means for controlling the energization of the motor.

In the accompanying drawings and descriptive matter I have illustrated my invention as applied to an electric motor drive for sewing machines, in which means are provided by which the operator can vary the ratio between the speed of the motor shaft and the speed of the sewing machine spindle. In this form of my invention I have connected to the speed varying means a device for opening and closing the motor circuit, arranging the parts so that when the speed varying means is in the position in which motion of the motor shaft causes little or no corresponding motion of the sewing machine spindle, the motor circuit is open; while in all other positions of the speed varying means, the motor circuit is closed.

The various novel features of construction and arrangement which characterize my invention are pointed out with particularity in the claims annexed to and forming a part of this specification.

For a better understanding of my invention, however, reference may be had to the accompanying drawings and descriptive matter in which I have illustrated and described one of the forms in which my invention may be embodied.

Figure 1:
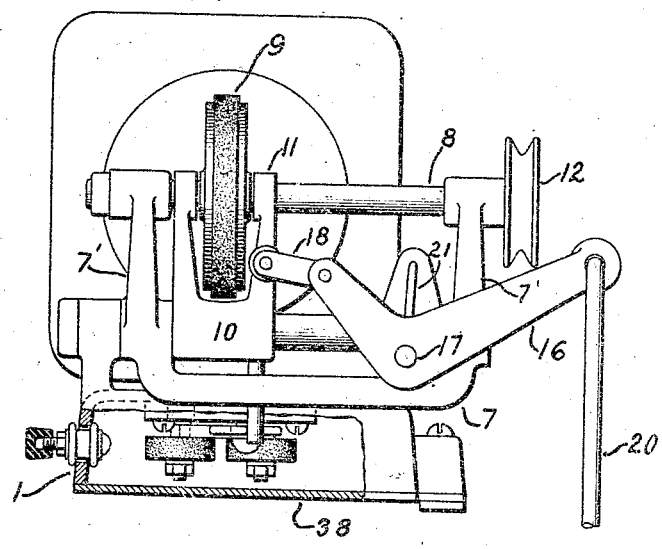
Figure 2:
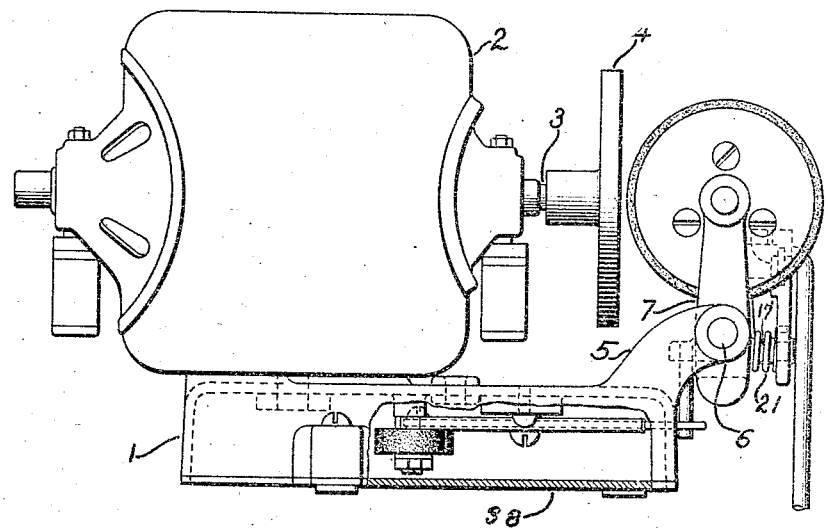
Figure 3:
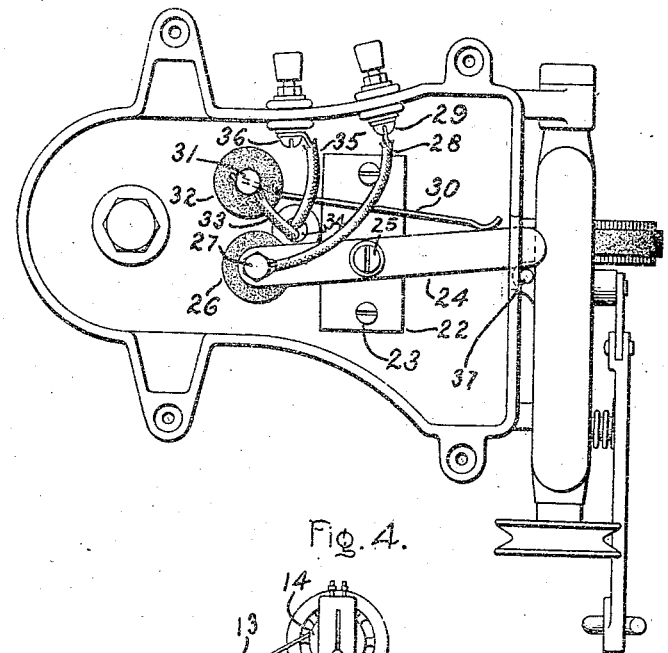
Figure 4:
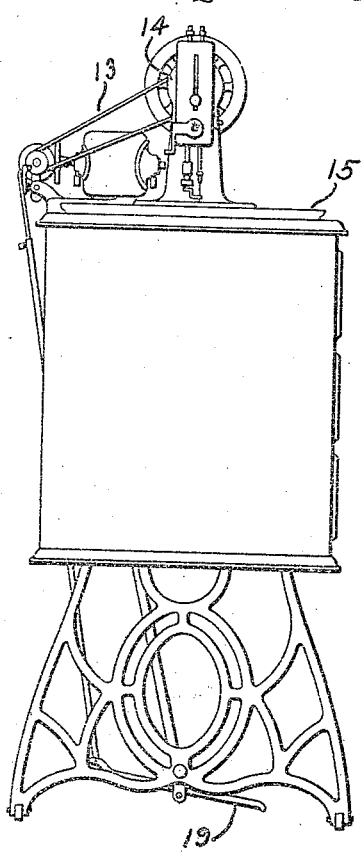

Of the drawings, Figure 1 is an elevation of the motor and parts directly connected to it; Fig. 2 is an elevation taken at right angles to Fig. 1; Fig. 3 is a view looking up at the bottom of the construction shown in Fig. 2; Fig. 4 is an elevation of a sewing machine equipped with my invention.

In the drawings, 1 represents a hollow base usually formed of cast iron on the upper side of which is rigidly secured the frame of an electric motor 2. The armature shaft 3 of the motor which projects from the frame carries at one end a friction disk 4. Lugs or brackets 5 projecting from the base 1 have journaled in them a shaft 6. The shaft 6 supports a U-shaped frame 7, the parallel arms 7' of which have journaled in their upper ends a counter shaft 8. The counter shaft 8 extends transversely to the armature shaft 3 and their axes are in the same plane.

A friction wheel 9 coöperating with the friction disk 4 is splined on the shaft 8. A yoke or bifurcated member 10 is slidingly mounted on the shaft 6 between the arms 7'. The bifurcations of the member 10 straddle the wheel 9 so that when the member 10 is moved along the shaft 6 the wheel 9 will be moved along the shaft 8. One end of the shaft 8 carries a grooved wheel 12 which is connected by a belt 13 to the driving wheel 14 of the sewing machine on the table 15 of which the base 1 is clamped. The tension of the belt 13 is adjusted to hold the friction wheel 9 against the friction disk 4 with the proper force. A bell crank lever 16 is pivotally mounted on a stud 17 carried by the frame 7. A link 18 connects one arm of the bell crank lever 17 to the member 10. The other arm of the bell crank lever is connected to the treadle 19 of the sewing machine by a connecting rod 20.

A helical spring 21 coiled about the stud 17' and having one end secured to the bell crank lever 17 and the other end secured to the frame 7 forms a means for normally holding the member 10 to the extreme left of its limit of movement as seen in Fig. 1. In that position the center of the friction wheel 9 is in line with the axis of the friction disk 4 and a rotation of the disk 4 will not cause rotation of the wheel 9. By rocking the treadle 19 about its pivotal points of support, the wheel 9 can be moved to the right as seen in Fig. 1, whereupon the rotation of the disk 4 will cause a rotation of the shafts 8 and a corresponding rotation of the sewing machine spindle. The speed of the shaft 8 will of course increase as the wheel 9 is moved farther away from the center of the disk 4.

A block 22 is secured to the under side of the top of the base 1 by screws 23. A lever 24 which may be formed of any insulating material having a proper mechanical strength is pivotally connected to the block 22 by a screw 25. The inner end of the lever 24 has secured it to a contact device 26. In the form of invention shown, the contact 26 is in the form of a disk of carbon which is pivotally mounted on a screw 27 carried by the inner end of the lever 24. A flexible conductor 28 has one end connected to the screw 27 and the other end to a binding post 29 carried by the base. The block 22 is formed with a kerf in its under face in which is secured a piece of spring metal 30 which may be a piece of hardened steel. The inner ends of the bar 30 carries a screw or pintle 31 on which is pivotally mounted a contact 32 which may be similar to the contact 27. A lead 33 forming one of the motor terminals is connected to the pintle 31. The lead 33 passes to the motor through the bushed opening 34 formed in the top of the base 1. The other terminal 35 of the motor, which also passes through the bushed opening 34 is connected to a binding post 36 similar to the binding post 29.

The outer end of the spring 30 bears against the edge of the lever 24 and normally tends to move the lever in the direction to bring about engagement between the contacts 27 and 32 to close the motor circuit. The outer end of the lever 24 projects through a slot formed in the sides of the base. A pin 37 carried by the member 10 is arranged to engage the outer end of the lever 24 and move it into the position shown in Fig. 3 when the member 10 is moved into the position shown in Fig. 1. It will of course be understood that the tension of the spring 21 is great enough to overcome the spring 30 so that when the treadle is released the spring 21 will throw the member 10 in the position shown in Fig. 1, at the same time separating the contacts 27 and 32.

With this construction when the operator wishes to start the sewing machine she oscillates the treadle 19 and thereby moves the member 10 away from the initial position shown in Fig. 1, against the tension of the spring 21. As soon as the pin 37 allows it to do so, the lever 24 turns under the action of the spring 30 into the position in which the contacts 27 and 32 engage, whereupon the motor is energized and begins to turn. When it is desired to stop the sewing machine, the treadle is released, whereupon the spring 21 moves the member 10 back into an initial position and opens the motor circuit.

By employing contacts of the character described no trouble is experienced from arcing when the contacts 27 and 32 are separated. The contacts 27 and 32 are rotated more or less by their yielding engagement and disengagement so that the arcing surfaces of the contacts are changed from time to time. This of course increases their lives. A cover plate 38 of any suitable material may be secured to the bottom of the base if desired.

The construction shown is simple, compact, reliable, and comparatively inexpensive to manufacture. It will be obvious to those skilled in the art that the invention is capable of somewhat general application and that modifications will be made in the form of the invention disclosed, without departing from its spirit.

What I claim as new and desire to secure by Letters Patent of the United States, is,—

1. In combination, a hollow base, relatively movable contacts located therein, a motor supported thereon, the circuit of which is controlled by the relative position of said contacts, a friction disk mounted on the motor shaft, a friction wheel coöperating with said disk, and means for supporting it, including a shaft upon which it is splined, and means for moving said wheel along said shaft and for simultaneously changing the relative position of said contacts.

2. In combination, an electric motor provided with a rotating shaft, a friction disk carried by said shaft, a countershaft extending transversely to said motor shaft, a friction wheel splined thereon, the periphery of said wheel engaging the face of said disk, and means tending to hold the friction wheel in an initial position in which its center is in alinement with the axis of said armature shaft, a lever controlling the energization of said motor, and means for moving the friction wheel out of said initial position and for simultaneously moving said lever into the motor energizing position.

3. In combination, an electric motor provided with a rotating shaft, a friction disk carried by said shaft, a countershaft extending transversely to said motor shaft, a friction wheel splined thereon, the periphery of said wheel engaging the face of said disk, a spring normally holding the friction wheel in an initial position in which its center is in alinement with the axis of said armature shaft, a pair of contacts controlling the motor circuit, a spring normally holding the contacts in the position in which to close the motor circuit, and a connection between said friction wheel and said contacts whereby when the wheel is moved into its initial position the contacts are opened.

In witness whereof, I have hereunto set my hand this 20th day of June, 1905.

GEORGE W. EUKER

Witnesses:
A. E. BROWN,
H. F. MORSE.